United States Patent [19]

Furusawa et al.

[11] Patent Number: 5,068,068
[45] Date of Patent: Nov. 26, 1991

[54] METHOD AND APPARATUS FOR EXTRUSION

[75] Inventors: Toshihiro Furusawa; Atsushi Satoh, both of Chiba; Takashi Nakajima; Noriaki Matsugishi, both of Tokyo, all of Japan

[73] Assignees: Idemitsu Kosan Co., Ltd.; Seidensha Electronics Co., Ltd., both of Tokyo, Japan

[21] Appl. No.: 440,509

[22] Filed: Nov. 22, 1989

[30] Foreign Application Priority Data

Nov. 24, 1988 [JP] Japan ................... 63-294624

[51] Int. Cl.⁵ .................. B06B 3/00; B29C 47/12; B29C 47/92
[52] U.S. Cl. .................. 264/23; 264/40.1; 264/40.7; 264/70; 264/71; 264/72
[58] Field of Search .................. 264/23, 70, 211.21, 264/211.23, 40.1, 40.7, 69, 71, 72; 425/174.2

[56] References Cited

U.S. PATENT DOCUMENTS

| 3,194,855 | 7/1965 | Jones et al. | 264/70 |
| 3,233,012 | 2/1966 | Bodine, Jr. | 264/23 |
| 3,285,442 | 11/1966 | Tigner | 264/70 |
| 3,619,429 | 11/1971 | Torigai et al. | 264/23 |
| 4,793,954 | 12/1988 | Lee et al. | 264/23 |
| 5,017,311 | 5/1991 | Furusawa et al. | 264/23 |

FOREIGN PATENT DOCUMENTS

| 134052 | 2/1979 | German Democratic Rep. | 264/23 |
| 138523 | 11/1979 | German Democratic Rep. | 264/23 |
| 57-51441 | 3/1982 | Japan . | |
| 386977 | 10/1973 | U.S.S.R. | 264/23 |
| 532529 | 5/1977 | U.S.S.R. | 264/23 |
| 706250 | 12/1979 | U.S.S.R. | 264/23 |

Primary Examiner—Leo B. Tentoni
Attorney, Agent, or Firm—Hidaka and Benman

[57] ABSTRACT

An improved method for carrying out an extrusion is provided, wherein an extrusion material in a flowable state is passed through a die under a pressure to impart a desired shape thereto, and the extrusion is carried out while the die is resonated by an ultrasonic wave in such a manner that the resonance occurs at an n wavelength, wherein n is m/2 and m is a positive integer. Further, an apparatus suitable for carrying out this extrusion method is provided.

3 Claims, 4 Drawing Sheets

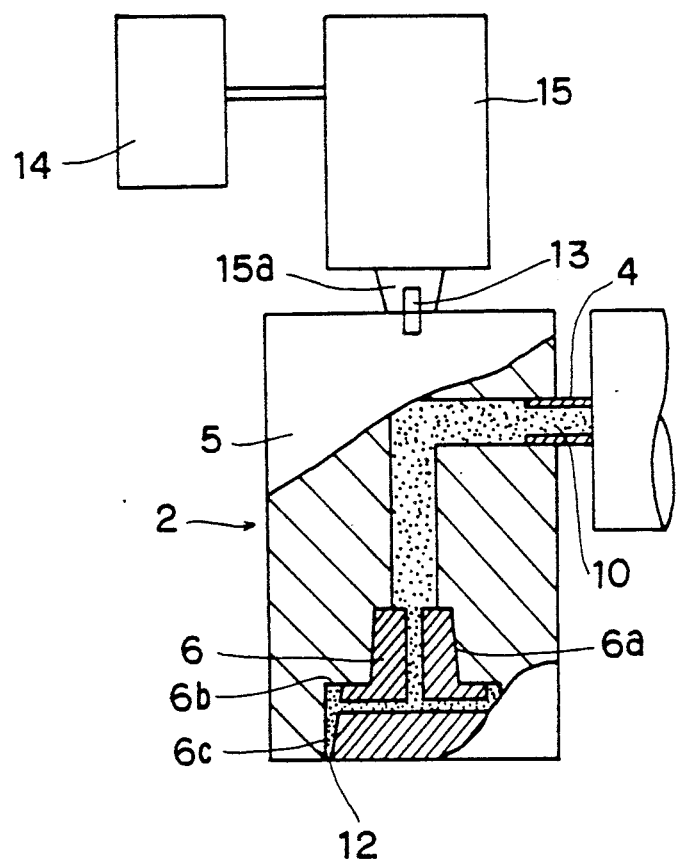
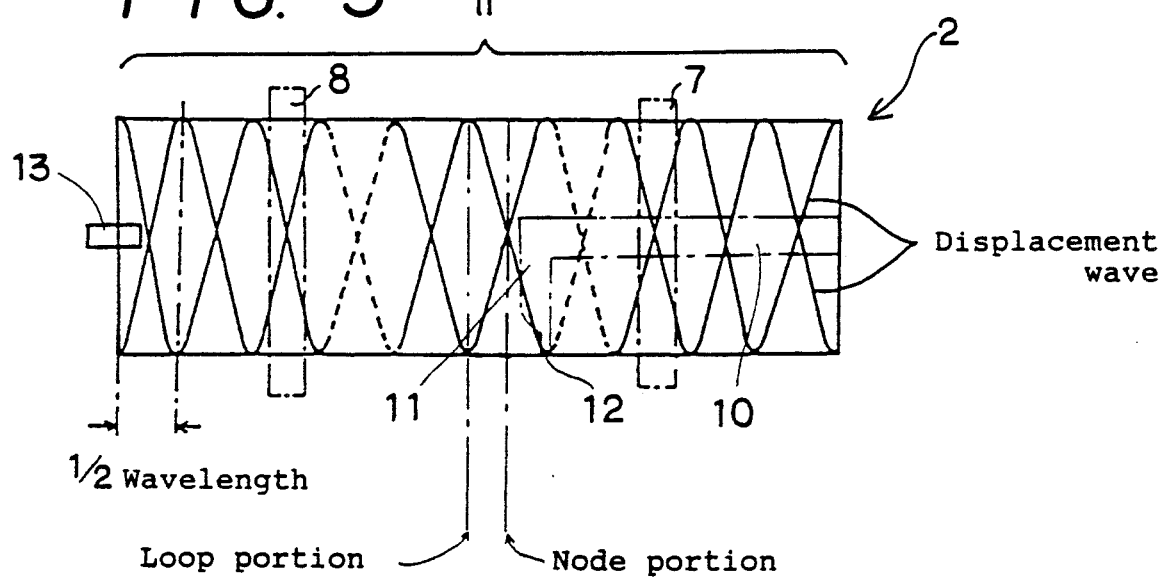

METHOD AND APPARATUS FOR EXTRUSION

BACKGROUND OF THE INVENTION

1. Field of the Invention

The present invention relates to a method for carrying out an extrusion, wherein an extrusion material is melted and delivered under a pressure by an extruder and then formed into a desired shape by being passed through a die. Further, the present invention relates to an apparatus for carrying out the above method.

2. Description of the Related Art

An extrusion apparatus generally has an extruder, a die, a cooling apparatus, and so on, arranged in series, and an extrusion material such as a plastic material is melted by the extruder and delivered therefrom under a pressure. The delivered material is then introduced into the die, and passed through the die to impart a desired shape to the material. The material extruded from the die is then cooled by the cooling apparatus.

Currently, extrusion materials such as a plastic material have an ever-increasing molecular weight, or contain an increasingly higher content of a filler such as inorganic material, to improve the physical properties of the products, such as strength, rigidity, slidability, or the like.

The plastic material improved as above, however, exhibits poor fluidity in the die during extrusion, and as a result, the surface of a formed article becomes rough (melt fractures), or a pressure in the die becomes extremely high, and the die is deformed to thereby cause distortion of the formed article. To avoid the above defects, it is necessary in the conventional apparatus to lower the extrusion speed, i.e., reduce the producing speed.

Under the above circumstances, attempts have been made to remedy such disadvantages by improving the fluidity of the extrusion material in the die during extrusion.

For example, Japanese Unexamined Patent Publication No. 57-51441 proposes a process for increasing the extrusion speed by flowing the material while applying a mechanical vibration to the die, to thereby improve the fluidity of the extrusion material. This process is not satisfactory, however, in that the mechanical vibration is merely applied to the fixed die, and thus, in practice little vibration is transmitted to the die, and therefore, satisfactory results cannot be obtained.

SUMMARY OF THE INVENTION

Accordingly, an object of the present invention is to provide a process and an apparatus for carrying out extrusion wherein the fluidity of an extrusion material in a die is improved by insuring the application of vibration to the die. This improvement of the fluidity of the extrusion material raises the productivity of the extruded article, and further, makes it possible to obtain very thin and fine articles.

To achieve the above object, in accordance with the present invention, an extrusion is performed while a die is resonated by an ultrasonic in such a manner that the resonance occurs at an n wavelength, wherein n is m/2 and m is a positive integer.

Further, an apparatus of the present invention for carrying out an extrusion has an extruder for delivering an extrusion material in a flowable state under a pressure; a die having an inlet for receiving the extrusion material delivered out of the extruder to the die, and an outlet for delivering the material from the die to impart a desired shape thereto; a transducer arranged at the die; and an ultrasonic generator connected to the transducer which transmits an ultrasonic vibration from the generator to the die.

Other objects and advantages of the present invention will be apparent from the following description.

BRIEF DESCRIPTION OF THE DRAWINGS

FIG. 2 is a partially cut-away side view of another embodiment of an extrusion apparatus according to the present invention;

FIG. 3 shows a displacement wave illustrating an embodiment of an ultrasonic resonance formed in a die when an extrusion is carried out in accordance with the present invention;

DESCRIPTION OF THE PREFERRED EMBODIMENTS

The present invention will be explained in detail hereinafter with reference to the accompanying drawings.

Figure 1:
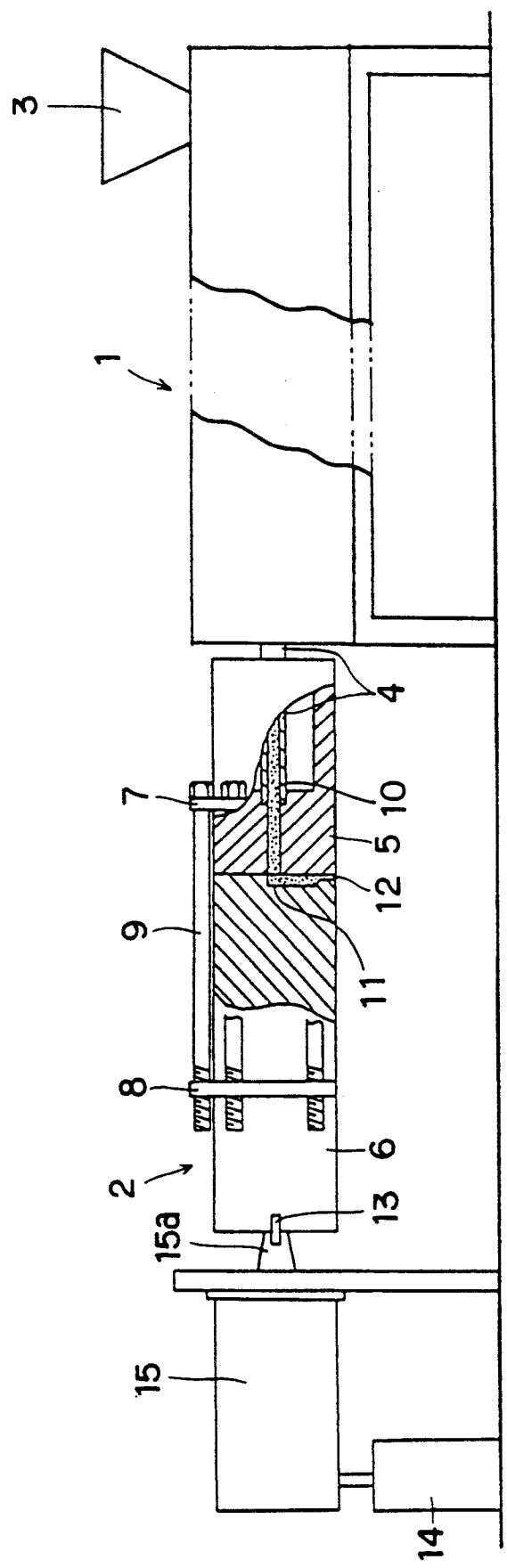
FIG. 1 is a partially cut-away side view of an embodiment of an extrusion apparatus according to the present invention.

An embodiment of an extrusion apparatus according to the present invention is shown in FIG. 1. The extrusion apparatus has an extruder 1 and a die 2. The extruder 1 is provided with a hopper 3 at one end thereof (right side of the extruder in FIG. 1), and a nozzle 4 at the opposite end thereof (left side of the extruder in FIG. 1).

An extrusion material is fed from the hopper 3, melted in the extruder 1, and delivered to the die 2 through the nozzle 4 of the extruder 1 in a melted state.

As illustrated in FIG. 1, the die 2 has a combination of a first die member 5 and a second die member 6. These members 5 and 6 are combined by clamping together a first fixing member, such as a first flange 7, fixed to the first die member 5 and a second fixing member, such as a second flange 8, fixed to the second die member 6, with bolts 9.

The first die member 5 has an inlet 10 for receiving the material extruded from the nozzle 4 of the extruder 1, and the second die member 6 has an inlet 11 for receiving the material from the first die member 5. The inlets 10 and 11 are connected to each other when the die members 5 and 6 are combined, and an outlet 12 for delivering the material from the die 2 is formed at a lower end of the interface formed when the die members 5 and 6 are combined.

The nozzle 4 in the extruder 1 is connected to the inlet 10 of the first die member 5, and thus the material delivered out of the extruder 1 is introduced through the inlet 10 to the first die member 5, and is passed through the inlet 11 to the second die member 6, and is then extruded from the die 2 through the outlet 12. The extruded material is cooled by a cooling apparatus (not shown). A desired shape is imparted to the material when it is extruded through the outlet 12.

At the side (left side in FIG. 1) opposite to the inlet side of the die 2, there are arranged an ultrasonic generator 14 and a transducer 15 driven by the generator 14 to generate the ultrasonic vibration. The right end of the transducer 15 is held in contact with the left end of the second die member 6, i.e., the surface opposite to the inlets 10 and 11 of the die 2. Namely, the transducer 15 is attached to the second die member 6 with a fixing member 13 such as a fixing screw. The vibration of the transducer 15 causes resonance of the die 2, i.e., the first die member 5 and the second die member 6.

In the present invention, the die is designed to resonate at the n wavelength by the ultrasonic vibration which is generated by the transducer.

FIG. 3 schematically shows the above resonance, wherein the resonance of the die 2 occurs at; where n is m/2, m is a positive integer, and in this particular case, n is 5. To reduce loss of the ultrasonic vibration in the die 2, n is preferably less than three (i.e., n<3).

As shown in FIG. 3, loop portions and node portions appear alternately in the resonated die 2. The term "loop portion" used here means a portion at which the displacement wave of the ultrasonic vibration has the widest amplitude, i.e., a point at which the vibration has the strongest magnitude, and the term "node portion" means a portion at which the displacement waves of the ultrasonic vibration cross each other, i.e., a point at which no vibration occurs.

In the embodiment as shown in FIG. 1, the die 2 is resonated during the extrusion, whereby a desired vibration of the die 2 occurs. As a result, the fluidity of the extrusion material flowing through the die 2 is greatly improved, and thus the productivity of the product from the outlet 12 is raised. Further, due to this enhanced fluidity of the material, the width of the die outlet 12 can be narrowed to enable the production of ultrathin or ultrafine articles.

Any resonance frequency can be employed for the die 2. But to efficiently impart the vibration to the material in a flowable state, the frequency is preferably from 1 kHz to 1 MHz, more preferably from 10 kHz to 100 kHz, and the amplitude of the ultrasonic vibration is preferably 0.1 to 100 $\mu$m, more preferably 5 to 50 $\mu$m to improve the fluidity of the extrusion material.

Preferably, the position at which the transducer 15 and the die 2, i.e., the second die member 6, are joined together coincides with the loop portion of the resonance of the die 2, whereby a most efficient transmission of the ultrasonic vibration can be obtained.

The die 2 may be prepared from various materials such as metal ceramic or graphite, etc., but is prepared preferably from materials capable of reducing ultrasonic vibration transmission loss at an extrusion temperature. From the above viewpoint, aluminum, duralumin, titanium alloy, or graphite is preferable.

The first die member 5 and the second die member 6 are preferably held in contact with each other by the surfaces thereof, to thereby ensure an efficient transmission of the ultrasonic vibration. Although the die 2 is composed of two die members 5 and 6 in the above embodiment, the die may be composed of a single member, or three or more members, depending upon the shape of the final article. Where the die 2 is composed of a plurality of members by combining the same, the combined portions are preferably positioned around (i.e., at or near) loop portions of the resonance of the die 2, to ensure a most efficient transmission of the ultrasonic vibration.

The position of the combined portion of the nozzle 4 and the inlet 10 of the first die member 5 preferably coincides with, or is around (i.e., at or near), one of the node portions of the resonance of the die 2, as this arrangement prevents a loss of the vibration of the die 2 to the exterior via the nozzle 4.

The position of the outlet 12, i.e., the interface of the combined first and second die members 5 and 6 in the embodiment as shown in FIG. 1, preferably coincides with, or is around (i.e., at or near), one of the loop portions of the resonance of the die 2, as this arrangement ensures that the vibration is efficiently applied to the extrusion material when delivered from the die 2.

The positions of the flanges 7 and 8 preferably coincide with, or are around (i.e., at or near), node portions of the resonance of the die 2, respectively, to prevent a vibration loss to the exterior. To reduce loss of the ultrasonic vibration at these portions, the thickness of each of the flanges 7 and 8 is preferably made as thin as possible.

Further, to avoid loss of the ultrasonic vibration of the die 2 to the exterior, the bolts 9 are preferably separated from (not in contact with) the first and the second die members 5 and 6.

The first die member 5 may be combined with the second die member 6 by a usual method, i.e., by boring holes through the die members and clamping the members together with bolts. In this case, however, to ensure that the bolts are not broken by the ultrasonic vibration, bolts made of titanium alloy, or the like should be used.

The design of the die 2 allows an adjustment of the resonance frequency by the ultrasonic generator 14, and therefore, the adjustment of the frequency can be effected to cope with momentary variations of the resonance frequency caused by momentary changes of a load in the die 2, from the introduction of the material through the nozzle 4 of the extruder 1 into the die 2, to the final extrusion of the material from the outlet 12. Further, the apparatus is designed to be able to supply the necessary power (not more than the maximum power) to cope with momentary variations thereof. Namely, the present apparatus employs a system for automatically monitoring and adjusting the frequency, and a system for automatically controlling the power.

Figure 7:
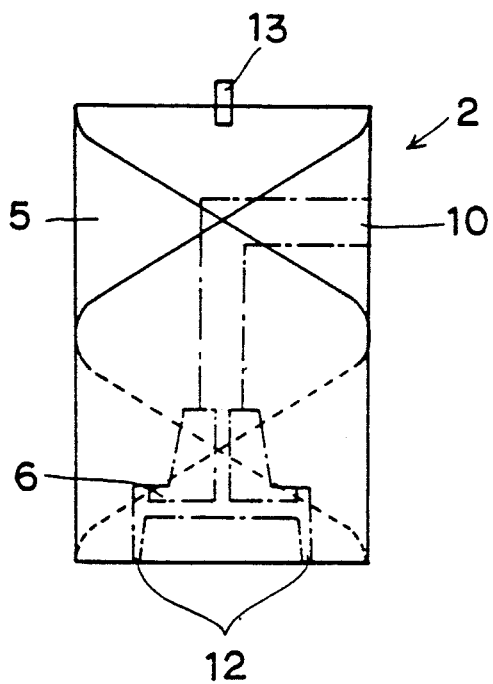
FIG. 7 shows a displacement wave illustrating the embodiment shown in FIG. 2.

FIG. 2 illustrates another embodiment of the extrusion apparatus according to the present invention, wherein the resonance of the die 2 occurs at one wavelength. In this embodiment, the inlet 10 for receiving the material is arranged at the right side of the die 2, and the outlet 12 for delivering the material is arranged to the lower side of the die 2. The transducer 15 is held in contact with the upper surface of the die 2. The die 2 has the first die member 5 and the second die member 6. The second die member 6 is generally cylindric, and has a head portion 6a with threads, a shoulder portion 6b, and a side wall portion 6c. The second die member 6 is threadedly engaged with the first die member 5 at the head portion 6a. As shown in FIG. 7, the engaged position of the first and the second die members 5 and 6, i.e., the position of the head portion 6a, is preferably located around (i.e., at or near) one of the node portions of the ultrasonic resonance in the die 2, and the shoulder portion 6b is preferably located around the center of node and loop portions of the resonance, because no or little vibration can assure firm engagement.

In the die 2 as shown in FIG. 1, the ultrasonic vibration is transmitted in a direction perpendicular to the flow of the extrusion material. But when the inlet 10 and the outlet 12 are arranged as shown in FIG. 2, the ultrasonic vibration can be transmitted in a direction which is parallel to the flow of the extrusion material. When an article such as a round column is produced, the latter embodiment is suitable for homogeneously exerting the ultrasonic vibration on the article.

The die 2 may be heated, preferably by a far infrared ray heater arranged in such a manner that the heater is not in contact with the die. In this case, the heater is preferably fixed with screws to the die 2 around (i.e., at or near) one of the node portions of the ultrasonic resonance in the die 2. The die 2 may be heated by the use of a heat transfer oil. In this case, an inlet and an outlet of the oil are preferably arranged around node portions of the ultrasonic resonance in the die 2.

The resonance is adversely affected, if a temperature distribution occurs in the heated die 2. In this case, it is desirable to design the die taking account of the temperature distribution so that the die 2 resonates well.

In a preferred embodiment of the present invention, a horn 15a or a device for changing the amplitude of the vibration of the transducer 15 may be arranged between the transducer 15 and the die 2, as shown in FIGS. 1 and 2.

According to still another embodiment of the present invention, a device for changing the direction of the vibration of the transducer 15 to a different direction may be arranged between the transducer 15 and the die 2.

Figure 4:
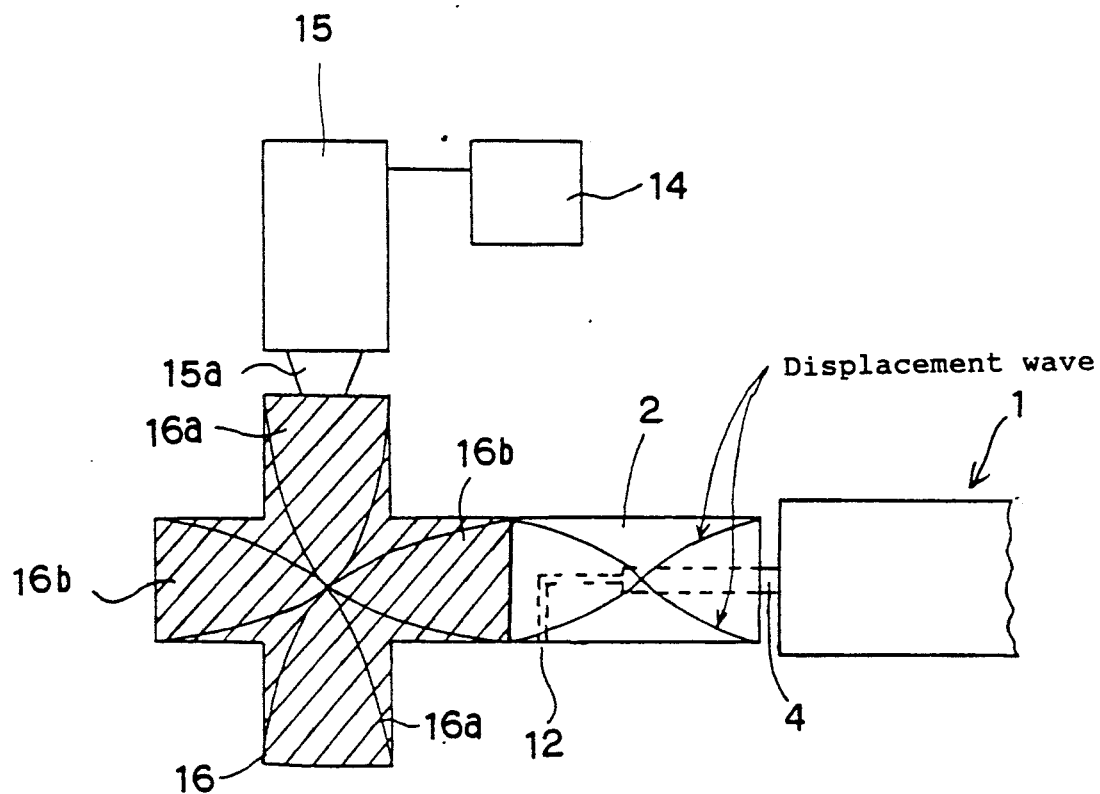
FIG. 4 is a schematic side view of still another embodiment of an extrusion apparatus according to the present invention.

FIG. 4 illustrates the embodiment of the present invention wherein the device 16 capable of changing the vibration direction, called a longitudinal-longitudinal transformer (hereinafter referred to as L—L transformer), is incorporated in the die. As shown in FIG. 4, the die 2 is provided with the L—L transformer 16 (shown as the hatched portion) composed of a pair of protrusions 16a and a pair of protrusions 16b. In the L—L transformer 16, the protrusions 16a (or the protrusions 16b) are opposite to each other, and the protrusions 16a and the protrusions 16b are at a right angle to each other. The L—L transformer 16 changes the direction of the vibration from the transducer 15 by 90°, and transmits the directionally-changed vibration to the die 2. By employing the L—L transformer 16 as described above, the transducer 15 can be arranged to the die 2 in a direction perpendicular to the direction in which the nozzle 4 is extended.

As the extrusion material which may be used in the method or the apparatus in accordance with the present invention, there may be mentioned any materials which are flowable during the extrusion; for example, organic materials such as resins, inorganic materials such as inorganic polymers, ceramics, metals, glass, or foodstuffs, or a mixture thereof.

As the resins, there may be mentioned thermoplastic resins, for example, alpha-olefin resins, such as polyethylene, polypropylene, polystyrene, syndiotactic polystyrene, polyvinyl chloride, polybutene, ultra-high-molecular-weight polyethylene, polymethylpentene, ionomer, polybutylene; polyester resins, such as polyethylene terephthalate, polybutylene terephthalate, polyarylate; polyether resins, such as polysulfone, polyether sulfone, polyether ketone, polyetherether ketone, polyallyl sulfone, polyoxybenzylene, polyphenylene oxide; polycarbonate resins; polyacetal resins; polyimide resins; cellulose resins; polyamide resins; polyvinylidene chlorides; polyamideimide resins; chlorinated polyethylenes; polymethacrylate resins; EVA resins (ethylene-vinyl acetate copolymers); fluorine resins; polyurethane resins; MBS resins (methacrylate butadiens styrene copolymer); silicone resins; AAS resins (acrylate acrylonitrile styrene); allyl resins; AS resins (acrylonitrile-styrene resins); furan resins; ACS resins (acrylonitrile-chlorinated polyethylene-styrene); liquid crystalline polymers; or ABS resins (acrylonitrile-butadiene-styrene resins). Thermosetting resins, for example, epoxy resin, phenol resin, polybutadiene resin, silicone resin, unsaturated polyester resin, or amino resin may also be used. Further, thermoplastic elastomers, for example, styrene-butadiene elastomer, polyester elastomer, polyethylene elastomer, urethane elastomer, or vinyl chloride elastomer may be used. When a resin is used in the present invention, the melt fracture is reduced, and thus a final article having satisfactory properties can be produced.

The term "extrusion method" used herein includes any process wherein the flowable material is passed through the die to impart a desired shape thereto, for example, tubular-film extrusion, sheet extrusion, round-rod extrusion, pipe extrusion, profile extrusion, multi-layer extrusion, blow molding, wire coating, prepreg molding or monofilament extrusion. Further, the method and apparatus of the present invention may be applied to a pultrusion which is basically analogous to the extrusion. Therefore, it should be understood that the term extrusion includes the pultrusion process. The pultrusion process according to the present invention significantly reduces the roughness of the surface of the final product.

EXAMPLES

The present invention now will be further illustrated by, but is by no means limited to, the following Examples, in comparison with Comparative Examples.

EXAMPLE 1

Figure 5:
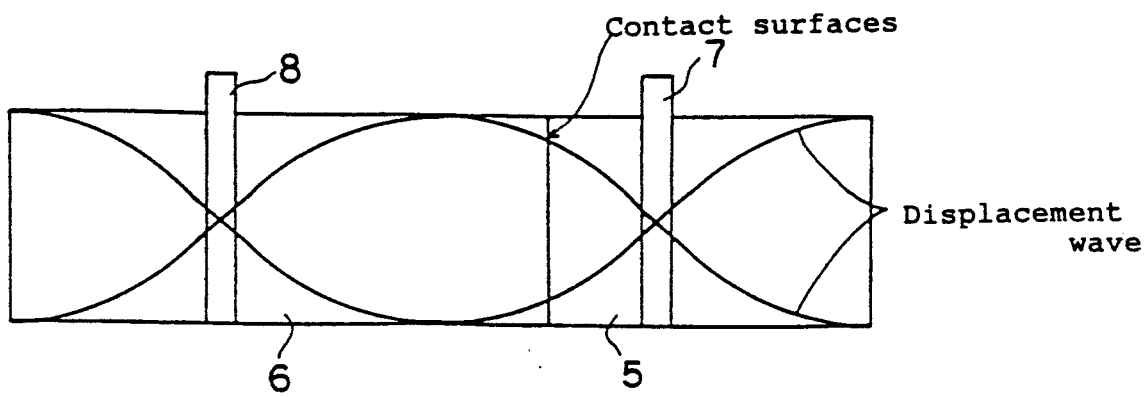
FIG. 5 shows a displacement wave illustrating another embodiment of an ultrasonic resonance formed in a die when an extrusion is carried out in accordance with the present invention.

An extrusion apparatus as shown in FIG. 1 was used to extrude polyethylene (640 UF, film blowing grade; Idemitsu Petrochemical Co., Ltd. The die used was designed to resonate at one wavelength as schematically illustrated in FIG. 5. The outlet 12 was positioned at a central point between node and loop portions of the ultrasonic resonance in the die 2. The die 2 was a straight-manifold type T die having a lip height of 0.5 mm and a sheet width of 30 mm. The ultrasonic generator (SONOPET 1200-B; Seidensha Electronics Co., Ltd.) used had a basic frequency of 19.15 kHz and an amplitude of 5 μm. As the transducer, a PZT type one was used.

The extrusion was carried out under the following conditions:

Temperature of the extrusion material: 160° C.
Temperature of the die: 160° C.
Extrusion speed: 0.5 to 5.0 (max) kg/hr.

The extrusion material was treated under the above conditions while the die 2 was resonated, and the amount of melt fracture was observed. Further, the pressure in the nozzle was measured at the extrusion speed of 0.5 kg/hr. The pressure reflects the flow resistance of the extrusion material from the nozzle to the die.

EXAMPLE 2

The procedure as described in Example 1 was repeated, except that, in the die 2, the outlet 12 was positioned at a loop portion of the ultrasonic resonance.

The results are listed in Table 1.

COMPARATIVE EXAMPLE 1

The procedure as described in Example 1 was repeated, except that the ultrasonic wave was not generated.

COMPARATIVE EXAMPLE 2

Figure 6:
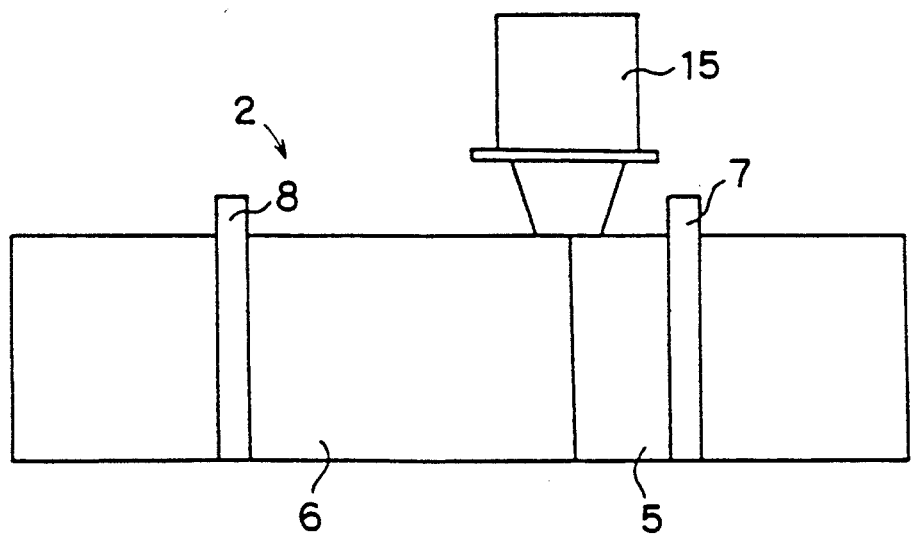
FIG. 6 is a schematic view of an apparatus not within the scope of the present invention, and prepared for comparison with the extrusion apparatus of the present invention.

The procedure as described in Example 1 was repeated, except that the transducer 15 was arranged at the die at the position at which the first die member 5 and the second die member 6 were combined, as shown in FIG. 6. The die 2 of this Comparative Example 2 was not resonated. The results of the Comparative Examples 1 and 2 are also listed in Table 1. The melt fracture observed was evaluated in three ratings as follows:

○: No melt fracture observed.
Δ: Some melt fracture observed.
×: Considerable melt fracture observed.

TABLE 1

|  | Extrusion speed (kg/hr) | | | |
| --- | --- | --- | --- | --- |
|  | 0.5 | 0.8 | 1.2 | 6.3 |
| Example 1 | ○ (125)* | ○ | ○ | Δ |
| Example 2 | ○ (101)* | ○ | ○ | ○ |
| Comparative Example 1 | Δ (168)* | × | × | × |
| Comparative Example 2 | Δ (167)* | × | × | × |

*pressure at nozzle (kg/cm²).

As is clear from Table 1, the flow resistance of the extrusion material can be reduced, the occurrence of melt fracture can be inhibited even at a very high extrusion speed, and the productivity can be improved, by applying the ultrasonic wave to the T die to cause a resonance therein.

Although the present invention has been described with reference to specific embodiments, various changes and modifications obvious to those skilled in the art are deemed to be within the spirit, scope and concept of the invention.

We claim:

1. An improved method of carrying out an extrusion in which an extrusion material in a flowable state is passed through a die under a pressure to impart a desired shape thereto, the improvement comprising a step of resonating the die by an ultrasonic wave at a resonance frequency of 10 kHz to 100 kHz so that the ultrasonic wave has n wavelengths, wherein n is m/2 and m is a positive integer.

2. An improved method of carrying out an extrusion according to claim 1, wherein the amplitude of the ultrasonic resonance of the die is 0.1 μm to 100 μm.

3. An improved method of carrying out an extrusion according to claim 1, wherein the resonance frequency of the die is automatically monitored and adjusted so as to cope with momentary variations of the resonance frequency caused by momentary changes of a load in the die.

* * * * *

UNITED STATES PATENT AND TRADEMARK OFFICE
CERTIFICATE OF CORRECTION

PATENT NO. : 5,068,068
DATED : November 26, 1991
INVENTOR(S) : Toshihiro Furusawa and Atsushi Satoh It is certified that error appears in the above-identified patent and that said Letters Patent is hereby corrected as shown below:

Column 3, line 21, delete "at;" and substitute --at n wavelengths;--.

Signed and Sealed this

Eighteenth Day of May, 1993

Attest:

MICHAEL K. KIRK

Attesting Officer     Acting Commissioner of Patents and Trademarks